(12) United States Patent
Rowe et al.

(10) Patent No.: US 9,635,223 B2
(45) Date of Patent: Apr. 25, 2017

(54) SCHMIDT TELESCOPE WITH EXTERNAL IMAGE CAPTURE

(71) Applicant: Celestron Acquisition, LLC, Torrance, CA (US)

(72) Inventors: David Rowe, Redondo Beach, CA (US); Corey Lee, Monterey Park, CA (US); Eric J. Kopit, Redondo Beach, CA (US); Mark Ackermann, Albuquerque, NM (US)

(73) Assignee: Celestron Acquisition, LLC, Torrance, CA (US)

( * ) Notice: Subject to any disclaimer, the term of this patent is extended or adjusted under 35 U.S.C. 154(b) by 136 days.

(21) Appl. No.: 14/681,029

(22) Filed: Apr. 7, 2015

(65) Prior Publication Data

US 2016/0299331 A1 Oct. 13, 2016

(51) Int. Cl.
*H04N 5/225* (2006.01)
*G02B 23/06* (2006.01)
*G02B 17/08* (2006.01)
*G02B 23/16* (2006.01)

(52) U.S. Cl.
CPC .......... *H04N 5/2252* (2013.01); *G02B 17/08* (2013.01); *G02B 23/06* (2013.01); *G02B 23/16* (2013.01)

(58) Field of Classification Search
CPC ........ G02B 23/10; G02B 23/12; G02B 23/16; H04N 5/2252; H04N 5/2254
USPC ...................................................... 348/335
See application file for complete search history.

(56) References Cited

U.S. PATENT DOCUMENTS

| | | | | |
|---|---|---|---|---|
| 4,342,503 A | * | 8/1982 | Shafer | G02B 17/0808 359/729 |
| 5,471,346 A | * | 11/1995 | Ames | G02B 17/0808 359/364 |
| 7,595,942 B2 | | 9/2009 | Koenig | |
| 7,933,067 B1 | | 4/2011 | Cook | |
| 2006/0132908 A1 | * | 6/2006 | Baun | G02B 7/1827 359/366 |

OTHER PUBLICATIONS

Ackermann, Mark R., et al., "An Overview of Wide-Field-of-View Optical Designs for Survey Telescopes", Sep. 2010.

* cited by examiner

*Primary Examiner* — Nhan T Tran
*Assistant Examiner* — Chan Nguyen
(74) *Attorney, Agent, or Firm* — Raubvogel Law Office

(57) ABSTRACT

A telescope system may facilitate the capture of images of light, and may have a housing, a primary mirror, a Schmidt corrector plate, and a lens group. The housing may have a mirror end and an aperture end with an entrance aperture that receives the light. The primary mirror may be positioned proximate the mirror end, and may have a spherical shape. The Schmidt corrector plate may be positioned proximate the entrance aperture to direct the light toward the primary mirror in a manner that substantially compensates for the spherical shape. The lens group may include multiple lenses, one or more of which may be positioned within the housing proximate the aperture end such that the light is directed through the lens group by the primary mirror. The lens group may focus the light at a focal location further than the Schmidt corrector plate from the primary mirror.

60 Claims, 7 Drawing Sheets

| | |
|---|---|
| Optical Design | Rowe-Ackermann Schmidt |
| Aperture | 279 mm |
| Focal Length | 620 mm |
| Focal Ratio | 2.22 |
| Central obstruction diameter | 114 mm |
| Optical Coatings | StarBright XLT |
| Total Telescope Kit Weight | 35 lbs |
| Optical Window | Broadband AR fully-multicoated removable optical window |
| Focuser | FeatherTouch MicroFocuser, 10:1 fine focus ratio |
| Cooling Fan | 12V DC, tip positive polarity |
| Optical Tube Length | 33 in |
| Backfocus from included camera adapters | 55 mm |
| Total back focus from flat surface above optical window | 72.8 mm |
| On-axis RMS spot size | <2.00 μm |
| RMS spot size 21 mm off-axis | <2.25 μm |
| Relative illumination 21 mm off-axis | 83% |
| Image Circle Diameter | 70 mm |

*Fig. 6*

SCHMIDT TELESCOPE WITH EXTERNAL IMAGE CAPTURE

TECHNICAL FIELD

The present disclosure relates to telescope systems, and more specifically, to wide-field telescopes with enhanced image capture capabilities.

BACKGROUND

A classical Schmidt telescope, also referred to as Schmidt camera, is a catadioptric astronomical telescope or camera designed to provide a relatively wide field of view while reducing aberrations in comparison with other telescopes. It is named for its inventor Bernhard Schmidt, who wrote of its properties in 1931 in "Ein lichtstarkes komafreies Spiegelsystem," Central-Zeitung für Optik and Mechanik 52.2 (1931), pp. 25-26. A detailed description of a flat field Schmidt telescope can be found in "Recent Advances in Optics," by E. H. Linfoot, Oxford University Press, 1955. Modern flat field Schmidt telescopes are typically used as survey instruments to facilitate coverage of a relatively large area of the sky.

Photographing celestial bodies introduces unique challenges. Many known telescopes require long exposure times, increasing the likelihood of blurring or motion effects during the exposure. Some known Schmidt telescopes focus the image within the housing of the telescope, providing little or no access to imaging components.

SUMMARY

Various embodiments of the technology described herein provide improved telescope systems and/or methods. In some embodiments, a telescope system may facilitate the capture of images of light. Such a telescope system may include a telescope, a support, a camera body, and a camera adapter. The support may support the housing at a user-adjustable orientation.

The telescope may have a housing, a primary mirror, a Schmidt corrector plate, and a lens group. The housing may have a mirror end and an aperture end with an entrance aperture that receives the light. The primary mirror may be positioned proximate the mirror end, and may have a spherical shape. The Schmidt corrector plate may be positioned proximate the entrance aperture to direct the light toward the primary mirror in a manner that substantially compensates for the spherical shape. The lens group may include multiple lenses, and may be positioned within the housing proximate the aperture end, such that the light is directed through the lens group by the primary mirror.

The lens group may focus the light at a focal location further than the Schmidt corrector plate from the primary mirror. The focal location may be outside the housing so that the camera body can be positioned outside the housing. Thus, the user may more easily access the camera body to make adjustments, capture images, and/or conduct other functions.

The housing may further have an entrance aperture with an annular shape that matches an annular shape of the Schmidt corrector plate at the aperture end. Further, the housing may have an exit aperture within the center of the entrance aperture through which the light is projected by the lens group. The light may further be focused through an optical window that covers the exit aperture.

The camera adapter may have a telescope fixation member with a telescope fixation feature attachable proximate the aperture end of the housing. Further, the camera adapter may have a camera fixation member with a camera fixation feature attachable to the camera body. The telescope fixation member may be rotatably coupled to the camera fixation member, until tightened, to permit adjustment of the angle at which the camera body is secured to the telescope. The camera adapter may take the place of a conventional lens attachable to the camera body. The image sensor of the camera body may be positioned at any suitable distance from the camera adapter; in one embodiment, it is positioned 55 mm from the camera adapter.

BRIEF DESCRIPTION OF THE IMAGES

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIG. 6 is a chart depicting exemplary specifications that may be incorporated into the design of a telescope system according to the present disclosure.

DETAILED DESCRIPTION

According to various embodiments, a telescope system with an enhanced Schmidt telescope design may be used to overcome one or more shortcomings of the prior art. The telescope system may be designed to permit positioning of a camera outside the telescope housing. This may facilitate image capture, and allow the telescope to be used with a variety of digital imaging systems. The manner in which this is accomplished will be shown and described subsequently.

Telescope System Configuration

Figure 1:
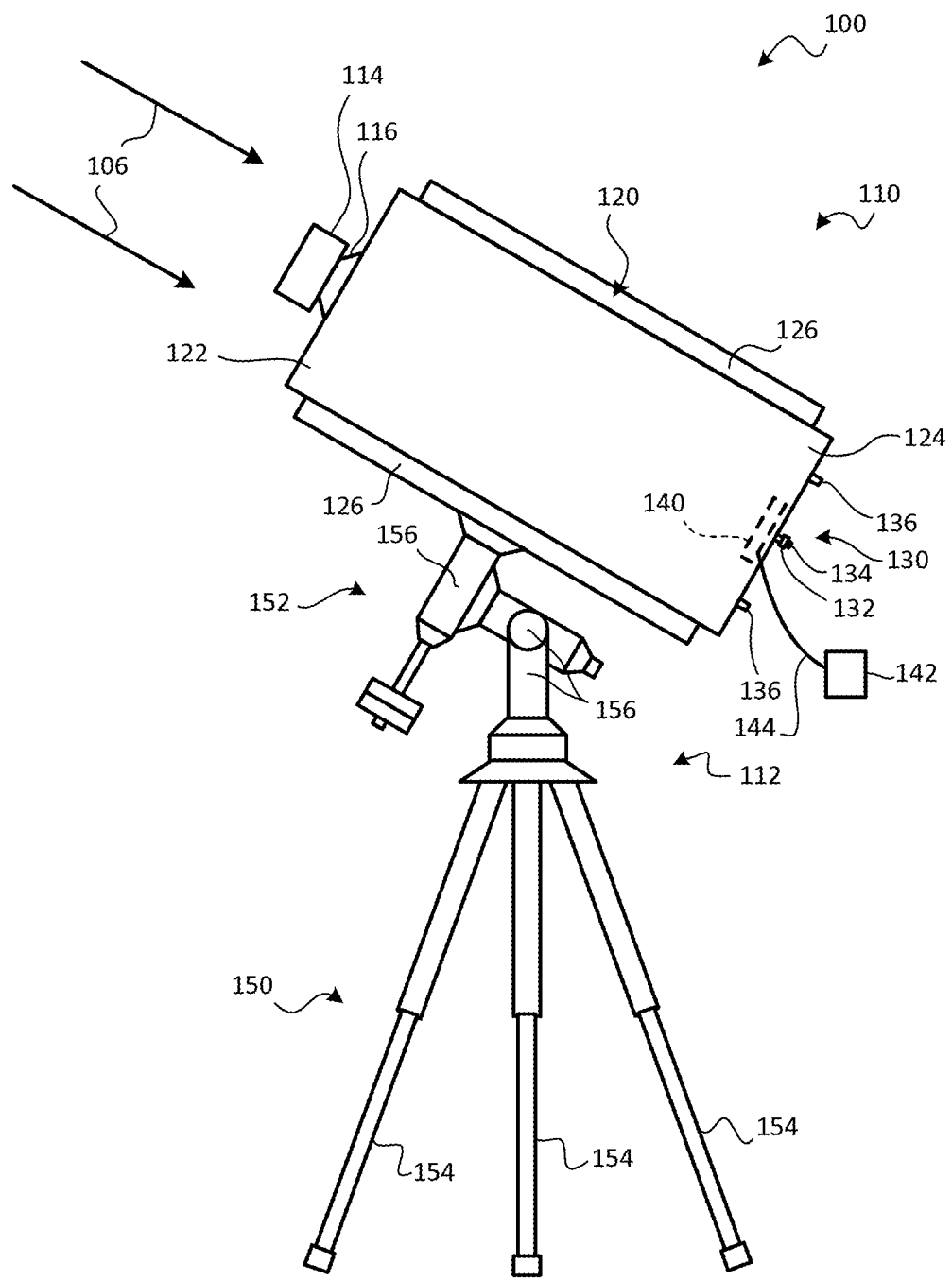
FIG. 1 is a side elevation view of a telescope system according to one embodiment.

Referring to FIG. 1, a side elevation view illustrates a telescope system 100 according to one embodiment. The telescope system 100 may be of a type suitable for viewing and/or photographing celestial bodies, or may be used for Earth-bound scientific observations or other purposes. In some embodiments, the telescope system 100 may be an astrograph suitable for capturing images of such celestial bodies. The images may be captured by receiving light 106, which may be extra-terrestrial light, and/or light from any other source.

As shown, the telescope system 100 may include multiple exemplary components. Such components may include, but need not be limited to, a telescope 110, a support 112, a camera body 114, and a camera adapter 116. The telescope 110 may be supported by the support 112 at an orientation suitable for viewing and/or photographing the desired extra-terrestrial subject matter.

The camera body 114 may be used to capture images of such extra-terrestrial subject matter, through the capture of light received by the telescope 110. In effect, the telescope 110 may act as a lens system for the camera body 114, which may not, in some embodiments, have a lens system independent of that provided by the telescope 110. The camera body 114 may be secured to the telescope 110 through the use of the camera adapter 116. All of these components will be shown and described in greater detail subsequently.

As shown, the telescope 110 may have a housing 120, which may have a generally tubular shape or other suitable shape. The housing 120 may be sized to provide the desired aperture size so that the telescope 110 can capture sufficient light to enable the capture of bright, clear images with low distortion, within a relatively short exposure period.

The housing 120 may have an aperture end 122 and a mirror end 124. The aperture end 122 may be oriented toward the subject matter to be viewed and/or imaged. The housing 120 may further have one or more accessory mounts 126, which may, for example, extend along opposite sides of the housing 120, parallel to a centerline (not shown) of the housing 120. If desired, the accessory mounts 126 may have dovetail shapes or other shapes that facilitate attachment of one or more other components to the housing 120.

On or proximate the mirror end 124, the telescope 110 may have a focus control 130, which may be used to adjust the focus of the telescope 110. The focus control 130 may, for example, have a coarse control knob 132 and a fine control knob 134, which may be rotated independently of each other to adjust the position of a primary mirror (not shown in FIG. 1) within the housing 120. The coarse control knob 132 may be used to make larger focus adjustments, and the fine control knob 134 may be used for finer focus adjustments.

In addition to the focus control 130, the telescope 110 may have, at or proximate the mirror end 124, a pair of mirror support clutches 136. The mirror support clutches 136 may help to hold the primary mirror in place once the focus control 130 has been used to move it into the position in which the telescope 110 is properly focused on the subject matter to be observed and/or imaged.

Accordingly, in order to adjust the focus of the telescope 110, the mirror support clutches 136 may first be loosened to release the primary mirror for adjustment. Then, the focus control 130 may be used to adjust the position of the primary mirror to adjust the focus of the telescope 110. This may be done, for example, by rotating the coarse control knob 132 first to make major adjustments, and then rotating the fine control knob 134 to make minor adjustments. Additionally or alternatively, focusing may be carried out by moving the camera body 114 relative to the housing 120 and optics contained within the housing 120, which will be shown and described in connection with FIG. 2.

Notably, heating or cooling may cause expansion or contraction of components of the telescope 110 to take place, thereby reducing the clarity and/or quality of imaging obtained through the telescope 110. Thus, if desired, the telescope 110 may have a mechanism that expedites the process of heating or cooling the telescope 110 to the temperature of the ambient environment. In some embodiments, such a mechanism may be a fan 140, which may expedite the exchange of air within the housing 120 with air outside the housing 120. In some embodiments, the fan 140 may be located within the housing 120, proximate the mirror end 124. The fan 140 may use magnetic bearings or the like in order to minimize wear, vibrations, and/or other motion of the telescope 110 that may otherwise occur during operation of the fan 140.

If desired, the fan 140 may be electrically operated. The fan 140 may be connected to a battery pack 142 through the use of a wire 144. The battery pack 142 may optionally be positioned outside the housing 120 so as to avoid interference with the operation of the telescope 110. If desired, the battery pack 142 may receive batteries of a type commonly used by consumers, such as standard "AA" batteries or other suitable batteries.

The support 112 may have a base portion 150 and a telescope mounting portion 152. The base portion 150 may provide stable support for the telescope mounting portion 152, and thence, for the telescope 110. Thus, the base portion 150 may have multiple legs 154 that provide such stability. If desired, the legs 154 may be arranged to define a tripod or other known support structure. The telescope mounting portion 152 may have one or more joints 156 that can be adjusted to adjust the orientation of the telescope 110 relative to the support 112. The telescope mounting portion 152 may have one or more mounting features that mate with and/or are otherwise secured to the accessory mount 126 of the telescope 110 that is adjacent to the telescope mounting portion 152.

The joints 156 may be user-adjustable in a variety of ways. According to some embodiments, the joints 156 may be manually adjusted and fixed in their respective desired orientations with set screws or other fixation devices. In other embodiments, the joints 156 may be motor-driven. Stepper motors or other motors that provide fine control and locking capability may be used. Such motors may, if desired, be electronically controlled. Thus, the telescope 110 may automatically be aimed at celestial bodies that are of interest and/or kept aimed at such celestial bodies as the motion of the Earth causes them to shift in the sky. Keeping the telescope 110 properly oriented via automatic motion of the joints 156 of the telescope mounting portion 152 may be particularly helpful for capturing images with longer exposure times.

The various components of the telescope 110 will be described in greater detail in connection with FIG. 2. Further, FIG. 2 will set forth the manner in which light may be received by the telescope 110 and directed to the camera body 114 for image capture.

Telescope Configuration

Figure 2:
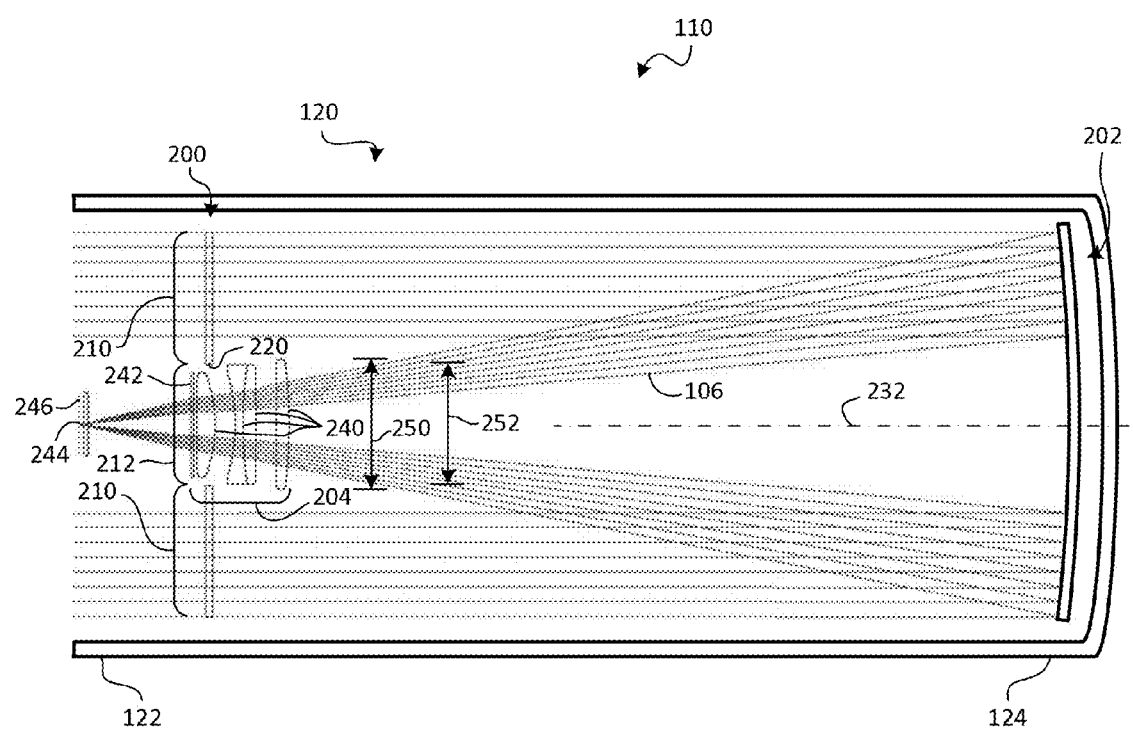
FIG. 2 is a side elevation, section view of the telescope of the telescope system of FIG. 1, illustrating components within the housing of the telescope.

Referring to FIG. 2, a side elevation, section view illustrates the telescope 110 of the telescope system 100 of FIG. 1. As shown, the telescope 110 may have various components retained within the housing 120. These components may include a Schmidt corrector plate 200, a primary mirror 202, and a lens group 204. These components may be used to conduct light 106 received within the housing 120 to the camera body 114 of FIG. 1.

As shown, the Schmidt corrector plate 200 may be positioned at or near the aperture end 122 of the housing 120. The Schmidt corrector plate 200 may have an annular shape that defines an entrance aperture 210 of the telescope 110. The entrance aperture 210 may have an annular shape that generally matches that of the Schmidt corrector plate 200. An exit aperture 212 may exist within the annular shape of the entrance aperture 210. The Schmidt corrector plate 200 may have a central passageway 220 aligned with the exit aperture 212.

The Schmidt corrector plate 200 may be designed to optically compensate for the shape of the primary mirror 202. In this application, a "plate" may include one or more optical components, such as lenses. The phrase "corrector plate" refers to any optical component or components that are designed to compensate for the optical properties of one or more other optical components. The Schmidt corrector plate 200 represents only one of multiple corrector plates that may be used to compensate for the shape of the primary mirror 202; other embodiments will be shown and described below, in connection with FIGS. 7A, 7B, and 7C.

The primary mirror 202 may have a generally spherical shape. In this application, a "spherical shape" does not require that an object have the shape of a full sphere; rather, a "spherical shape" may include any object with a concave surface or a convex surface that has a spherical curvature. Such a surface may represent only a sectorial or other portion of a sphere. In the case of the primary mirror 202, the generally spherical shape may exist only where the primary mirror 202 is aligned with the Schmidt corrector plate 200. Thus, the primary mirror 202 may also define a ring-like shape, which may be aligned with an axis 232 of the housing 120.

The Schmidt corrector plate 200 may be a specialized lens with a curvature designed to compensate for the spherical shape of the primary mirror 202. Thus, the Schmidt corrector plate 200 may have surface contouring and/or a material selection that causes the light 106 to impinge on the primary mirror 202 in a manner that compensates for the spherical curvature. Thus, the entrance aperture 210 may be relative large, and the Schmidt corrector plate 200 and the primary mirror 202 may cooperate to direct the light 106 to an image sensor that is much smaller than the entrance aperture 210. This may be facilitated by directing the light 106 at the lens group 204.

The lens group 204 may include multiple lenses 240, as shown. The lenses 240 may have shapes and/or material selections that cooperate with each other to focus the light 106 through an optical window 242, at a focal location 244 located further than the Schmidt corrector plate 200 from the primary mirror 202. More specifically, the distance between the focal location 244 and the primary mirror 202 may be greater than the distance between the Schmidt corrector plate 200 and the primary mirror 202. The focal location 244 is shown on an image sensor 246, which may be part of the camera body 114.

Thus, rather than positioning the image sensor 246 between the Schmidt corrector plate 200 and the primary mirror 202, the image sensor 246 may be positioned at a more accessible location. In some embodiments, as depicted in FIG. 2, the focal location 244, and thence the image sensor 246, may be positioned outside the housing 120 of the telescope 110. This may enable a user to use a variety of different camera bodies 114, and may facilitate image capture by providing relatively unfettered access to the camera body 114. Thus, the user may readily adjust the settings used by the camera body 114, rotate the camera body 114 relative to the telescope 110, access the film or digital storage media on which the camera body 114 captures images, change the batteries in the camera body 114, and/or the like.

In some known Schmidt telescope designs, light is focused on a curved surface. Such an arrangement may require the use of specialized image capture equipment and/or techniques. The lens group 204 may be designed such that the light 106 is projected onto a planar surface, such as that of the image sensor 246 illustrated in FIG. 2. Thus, the lens group 204 may be designed such that the lenses of the lens group 204 cooperate to act as a "field flattener," or lens system designed to cause the light 106 to be focused, by the lens group 204, on a planar surface.

The number, shape, and positioning of the lenses 240 of the lens group 204 shown in FIG. 2 is merely exemplary. The lens group 204 may include any number of lenses 240. In various embodiments, one, more than one, two, three, or all of the lenses 240 of the lens group 204 may be positioned between the Schmidt corrector plate 200 and the primary mirror 202. In other embodiments, some or all of the lenses 240 can be located elsewhere within the housing 120, and/or outside the housing 120.

Optionally, one or more of the lenses 240 of the lens group 204 may be inserted into the interior of the housing 120 before the Schmidt corrector plate 200 is positioned. Thus, if desired, one or more of the lenses 240 of the lens group 204 may have an outer diameter 250 that is larger than a passageway diameter 252 of the central passageway 220 of the Schmidt corrector plate 200 (and is therefore larger than the diameter of the exit aperture 212). In this manner, the geometry of one of more of the lenses 240 of the lens group 204 need not be limited by the size of the central passageway 220 and the exit aperture 212. However, in alternative embodiments, each of the lenses 240 of the lens group 204 may have an outer diameter smaller than the passageway diameter of the central passageway 220 and the exit aperture diameter of the exit aperture 212, so that the lens group 204 can be inserted into position after the Schmidt corrector plate 200 has been placed in the housing 120.

Similarly, the shape of the Schmidt corrector plate 200 and the shape of the primary mirror 202 in FIG. 1 are also exemplary. Those of skill in the art will recognize that many variations may be used. Additionally, the Schmidt corrector plate 200, the primary mirror 202, and the lens group 204 may be formed of any of a wide variety of materials, as known in the optical arts.

The Schmidt corrector plate 200, the primary mirror 202, and the lens group 204 may be designed to direct, reflect, and/or focus light 106 of a wide variety of wavelengths. According to some embodiments, the Schmidt corrector plate 200, the Schmidt corrector plate 200, and the lens group 204 may be designed primarily for the transmission of visible light. However, in alternative embodiments, the Schmidt corrector plate 200, the primary mirror 202, and the lens group 204 may be designed to direct, reflect, and/or focus electromagnetic radiation of non-visible wavelengths, including but not limited to radio, infrared, ultraviolet, and microwave radiation. Similarly, the image sensor 246 may be designed to capture visible light and/or electromagnetic radiation of non-visible wavelengths. In this application, the phrase "light" refers to electromagnetic radiation of any wavelength, and is therefore not limited to visible light.

As shown in FIG. 1, the camera body 114 may be separate from the telescope 110. The image sensor 246 illustrated in FIG. 2 may thus be incorporated into the camera body 114, which may be secured to the telescope 110 by the user. The manner in which this may be done will be shown and described in connection with FIG. 3.

Camera Attachment

Figure 3:
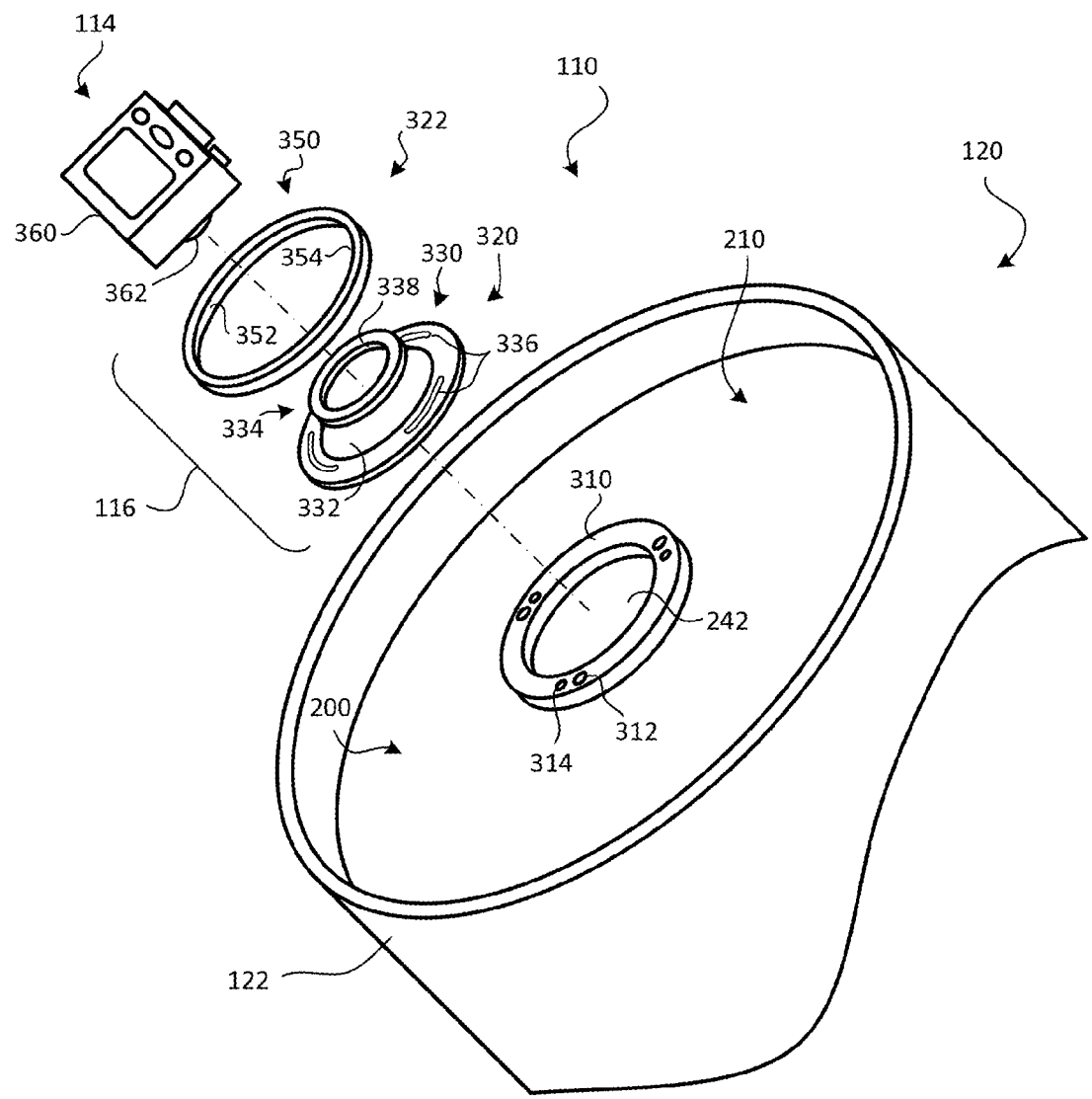
FIG. 3 is a perspective view of the camera body, the camera adapter, and a portion of the telescope of the telescope system of FIG. 1.

Referring to FIG. 3, a perspective view illustrates the camera body 114, the camera adapter 116, and a portion of the telescope 110 of the telescope system of FIG. 1. More specifically, FIG. 3 illustrates the aperture end 122 of the housing 120 in greater detail.

As shown, the Schmidt corrector plate 200 may have a retention ring 310. The optical window 242 of FIG. 2 may be retained by the retention ring 310. If desired, the lens group 204 may also be retained by the retention ring 310. Alternatively, if desired, the lens group 204 may be retained within the housing 120 by other structures.

The Schmidt corrector plate 200 may be secured to the housing 120 via an exterior retaining ring (not shown) positioned at its exterior perimeter. The retention ring 310 may encircle and/or protect the optical window 242. The optical window 242 may simply be a placeholder for a filter (not shown), which may optionally be installed in place of the optical window 242 to mitigate the effects of light pollution and/or provide other effects. The optical window 242 may have light refraction characteristics that are the same as or similar to those of such filters, so that the focus and optical performance of the telescope 110 will not change significantly after replacement of the optical window 242 with a filter.

Collimation of the telescope 110 may be performed to provide proper focusing of the light 106 at the focal location 244. According to one example, this collimation may be carried out through the use of adjustable features on the retention ring 310, which may take the form of set screw pairs that can be adjusted through the use of a tool such as a screwdriver. Adjustment of the screw pairs may alter the orientation of the lens group 204 relative to the housing 120 and the Schmidt corrector plate 200. In some embodiments, each screw pair may include a large screw 312 and a small screw 314. The screw pairs may be distributed about the retention ring 310 such that a user can tilt the lens group 204 relative to the primary mirror 202 by adjusting the proper screw or screw pairs. If desired, the large screw 312 and the small screw 314 of each screw pair may be coupled in a push/pull arrangement such that the one of the screws is loosened and the other is tightened to provide the needed adjustment, while keeping the components of the telescope 110 in a relatively stable arrangement that maintains the effects of the collimation. By tilting the lens group 204 relative to the primary mirror 202, optimal optical performance for the telescope 110 can be achieved. In other embodiments, the primary mirror 202 and/or Schmidt corrector plate 200 may have their own tilt and/or positional adjustments.

As shown in FIG. 3, the camera adapter 116 may have multiple parts, which may include a camera fixation member 320 and a telescope fixation member 322. The camera fixation member 320 may be attachable to the camera body 114 and the telescope fixation member 322 may be attachable to the telescope 110, or more specifically, to the retention ring 310.

The camera fixation member 320 may have a flange 330, a frustoconical segment 332, and a collar 334. The flange 330 may have a size similar to that of the retention ring 310 such that the flange 330 lies on the retention ring 310 when the camera fixation member 320 is attached to the retention ring 310. The frustoconical segment 332 may have a generally hollow frustoconical shape that transitions from the size of the flange 330 to that of the collar 334.

The flange 330 may have features, such as the slots 336 illustrated in FIG. 3, that facilitate collimation while the camera fixation member 320 is secured to the retention ring 310. Specifically, when the camera fixation member 320 is secured to the retention ring 310, the flange 330 may cover the retention ring 310 in such a manner that each of the slots 336 overlies one of the screw pairs. Thus, each of the slots 336 may provide access to one of the screw pairs. Collimation may advantageously be carried out with the benefit of imaging captured by the camera body 114; hence, the slots 336 may beneficially enable collimation to be done with the camera body 114 attached to the telescope 110 via the camera adapter 116.

The collar 334 may be sized to engage the camera body 114. Specifically, the collar 334 may have a camera fixation feature 338 that is designed to be secured to a corresponding feature of the camera body 114. In some embodiments, the camera fixation feature 338 may be threading that mates with standard T-threads found on many camera bodies. The camera fixation feature 338 may be securable to the camera body 114 in a manner similar to that of other interchangeable lenses that are frequently used in connection with camera bodies. If desired, the telescope system 100 may include multiple camera fixation members 320 of different sizes that facilitate attachment to camera bodies of different types and/or sizes. For some camera bodies, such as DSLR cameras, a T-ring may be used to secure the camera fixation feature 338 to the camera body 114.

The telescope fixation member 322 may be designed to secure the camera adapter 116 to the telescope 110, or more specifically, to the retention ring 310. The telescope fixation member 322 may also capture the camera fixation member 320, thereby effectively securing the camera fixation member 320 to the retention ring 310. The telescope fixation member 322 may have a collar 350 that can be secured to the retention ring 310 through the use of a telescope fixation feature 352. The telescope fixation feature 352 may, for example, be female threading of a type that mates with male threading on the outside diameter of the retention ring 310. Thus, the telescope fixation member 322 may be rotated into engagement with the retention ring 310.

The collar 350 may also have a lip 354 that protrudes inward to capture the flange 330 against the retention ring 310. The lip 354 may have an inside diameter large enough to permit the collar 334 and the frustoconical segment 332 to pass through the lip 354 without impediment.

The camera body 114 may be provided as part of the telescope system 100, or alternatively, provided separately. In some examples, the telescope 110 may be used with camera bodies of a wide variety of makes and models. Thus, the camera body 114 may be a DSLR camera body, a CCD camera body, or the like. In some embodiments, the focal location 244 may be at a predetermined location relative to the camera adapter 116. This predetermined location may be a predetermined distance beyond the collar 334 of the camera fixation member 320. This predetermined distance may be equal to a common "backfocus" measurement used by many camera bodies. The backfocus distance may be the distance between the image sensor 246 of the camera body 114 and the standard T-ring. Thus, the backfocus distance may also be the distance between the image sensor 246 and the collar 334 of the camera fixation member 320.

DSLR cameras may commonly have a backfocus of 55 mm. Thus, the camera fixation member 320 may be shaped to provide a backfocus distance of 55 mm. However, CCD cameras and/or other camera bodies may have a different backfocus difference, which may be greater than or less than 55 mm. If desired, other adapters may be used, in addition to or in the alternative to the camera fixation member 320, to provide the needed backfocus distance so that the focal location 244 is on the image sensor 246, as shown in FIG. 2.

The camera body 114 may have a variety of components. According to some known designs, the camera body 114 may have a main body 360 and a lens attachment feature 362 that protrudes from the main body 360. The lens attachment feature 362 may have T-threads or other attachment features that mate with the camera fixation feature 338 of the camera fixation member 320. The image sensor 246 (not shown in FIG. 3) may reside within the interior of the main body 360.

In at least one embodiment, a smartphone or other image capture device can be used in place of a camera, and the system design can be modified appropriately to operate with such a device.

The telescope system 100 may be used and made in a variety of ways. An exemplary method of use will be set forth in connection with FIG. 4. An exemplary method of manufacture will be set forth in connection with FIG. 5, as follows.

Method of Use

Figure 4:
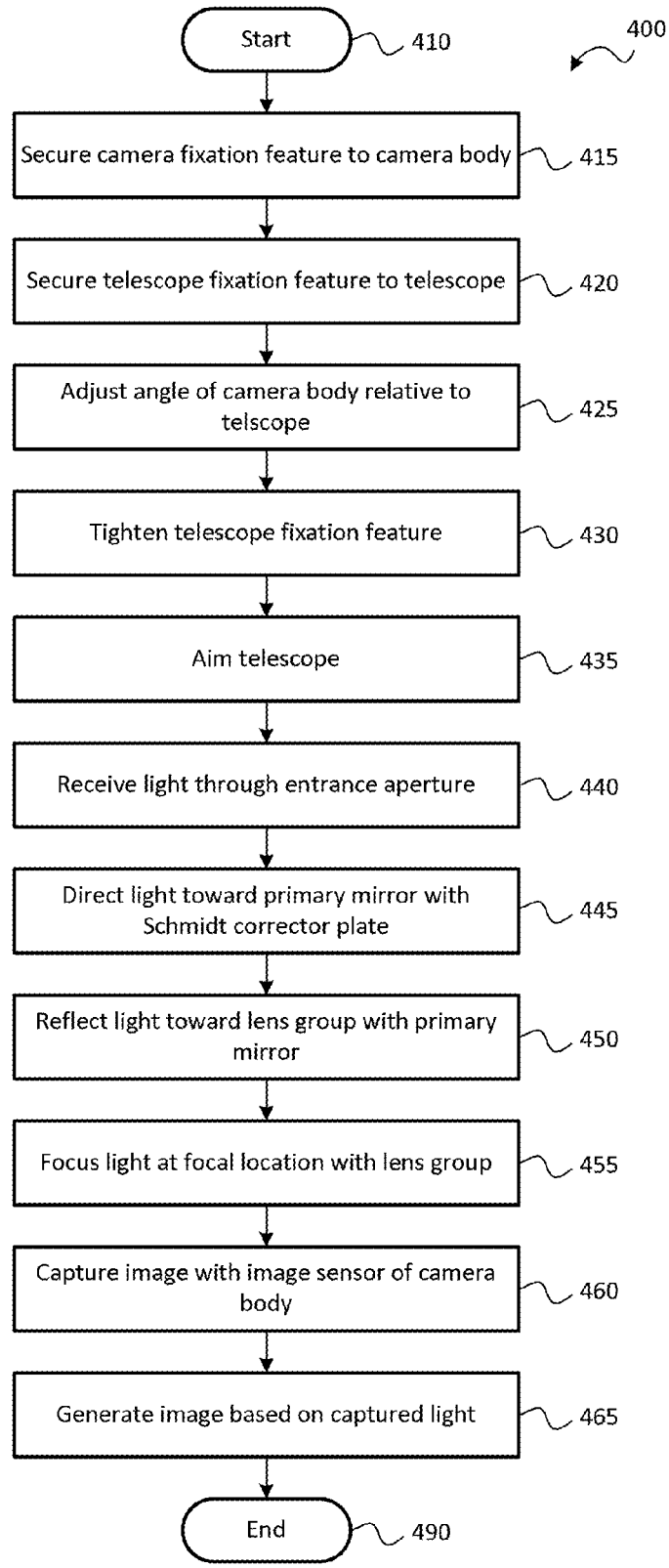
FIG. 4 is a flowchart diagram depicting a method of using a telescope system according to one embodiment.

Referring to FIG. 4, a flowchart diagram illustrates a method 400 of using a telescope system according to one embodiment of the invention. The method 400 will be described in connection with the telescope system 100 and the camera body 114 of FIGS. 1-3. However, the method 400 is not limited to the telescope system 100 and the camera body 114 of these figures, but may instead be used in connection with a telescope system and/or camera body according to various alternative embodiments.

The method 400 may start 410 with a step 415 in which the camera fixation feature 338 is secured to the camera adapter 116. This may entail rotating the camera fixation member 320 relative to the camera body 114 such that the camera fixation feature 338, which may include threads, engages corresponding threads of the lens attachment feature 362 of the camera body 114. Rotation may continue until engagement of the camera fixation feature 338 and the lens attachment feature 362 is relatively tight.

In a step 420, the telescope fixation feature 352 may be secured to the telescope 110. This may entail rotating the telescope fixation member 322 relative to the retention ring 310 such that the telescope fixation feature 352, which may include threads, engages corresponding threads of the retention ring 310.

The step 420 may advantageously be carried out with the frustoconical segment 332 of the camera fixation member 320 positioned to extend through the lip 354 of the telescope fixation member 322 such that, as the telescope fixation member 322 is rotated on the retention ring 310, the flange 330 of the camera fixation member 320 is sandwiched between the outwardly-facing surface of the retention ring 310, and the lip 354 of the telescope fixation member 322. Rotation may cease before the telescope fixation member 322 is tightly secured against the retention ring 310 so as to permit rotation of the camera fixation member 320 as the next step is carried out.

In a step 425, the angle (i.e., orientation) of the camera body 114 may be adjusted relative to the telescope 110. This may be done by rotating the camera body 114 and the attached camera fixation member 320 until the camera body 114 is at the desired orientation relative to the telescope 110. This rotation may be facilitated by the fact that the telescope fixation member 322 has not yet been tightened on the retention ring 310, so the camera fixation member 320 may rotate relatively freely against the retention ring 310.

In a step 430, the telescope fixation feature 352 may be tightened on the retention ring 310. This may entail further rotation of the telescope fixation member 322 relative to the retention ring 310 until the telescope fixation feature 352, which may include threads, more tightly engages the threads of the retention ring 310. This may ideally be done without rotating the camera body 114 or the camera fixation member 320 because, after performance of the step 425, the camera body 114 may already be in the desired orientation relative to the telescope 110.

In a step 435, the telescope 110 may be aimed at the desired portion of the sky to be viewed and/or imaged. If the telescope 110 has not already been secured to the telescope mounting portion 152, this may now be done, for example, by securing one of the accessory mounts 126 of the telescope 110 to the telescope mounting portion 152. Then, the joints 156 of the telescope mounting portion 152 may be adjusted until the telescope 110 points in the desired direction. This may be done manually and/or through the use of computerized guidance. Further, if desired, one or more images may be captured with the camera body 114 to permit the telescope 110 to be more precisely targeted at the desired location.

In a step 440, the light 106 may be received through the entrance aperture 210 of the telescope 110. In a step 445, the light 106 may be directed, by the Schmidt corrector plate 200, at the primary mirror 202 in a manner that corrects for the spherical shape of the primary mirror 202. In a step 450, the light 106 may be reflected, with the primary mirror 202, toward the lens group 204. In a step 455, the light 106 may be focused at the focal location 244. As shown and described previously, the focal location 244 may be outside the housing 120, and may desirably be on the image sensor 246 of the camera body 114. This step may also entail field-flattening the light 106, if the lens group 204 is designed to operate as a field flattener.

In a step 460, the light 106 from the lens group 204 may be captured with the image sensor 246 of the camera body 114. This may be accomplished according to any method known in the photography arts, including but not limited to digital capture and analog (i.e., film-based) capture. Further, a wide variety of camera settings may be used to perform image capture. The exposure time may be relatively short, or may be longer.

In a step 465, an image may be generated based on the light 106 captured by the image sensor 246 in the step 460. The image may be a photograph of the portion of the sky at which the telescope 110 was directed for the duration of the capture process. The image may be digital or analog. The image maybe stored in the camera body 114 and/or displayed for the user on a screen of the camera body 114 or on an external monitor (not shown). The method 400 may then end 490.

Optionally, performance of the step 465 may entail capturing multiple images, or "subs," which may be combined or "stacked" to define a "stacked master" image. Such stacking procedures may help to enhance image details, such as faint details of astronomical objects, which may be difficult to render with a single image. Additionally or alternatively, where the light 106 captured by the telescope 110 includes non-visible wavelengths, the method 400 may include conversion of this captured light into the visual spectrum on the image generated. Thus, non-visual light may be presented to the user in visual form.

Optionally, the method 400 may include making various other adjustments to the telescope 110. Such adjustments may optionally include collimation of the telescope 110 as described previously in the description of the retention ring 310 of FIG. 3. Additionally or alternatively, such adjustments may include adjusting the focus of the telescope 110 through the use of the focus control 130 and the mirror support clutches 136, as described previously in the description of these components in the discussion of FIG. 1.

The order of the various steps of the method 400 shown in FIG. 4 is merely exemplary; those of skill in the art will recognize that the steps of the method 400 may be reordered in numerous combinations. Further, any of the steps of the method 400 may be omitted or replaced with any alternative that would be known to a person of skill in the art.

Method of Manufacture

Figure 5:
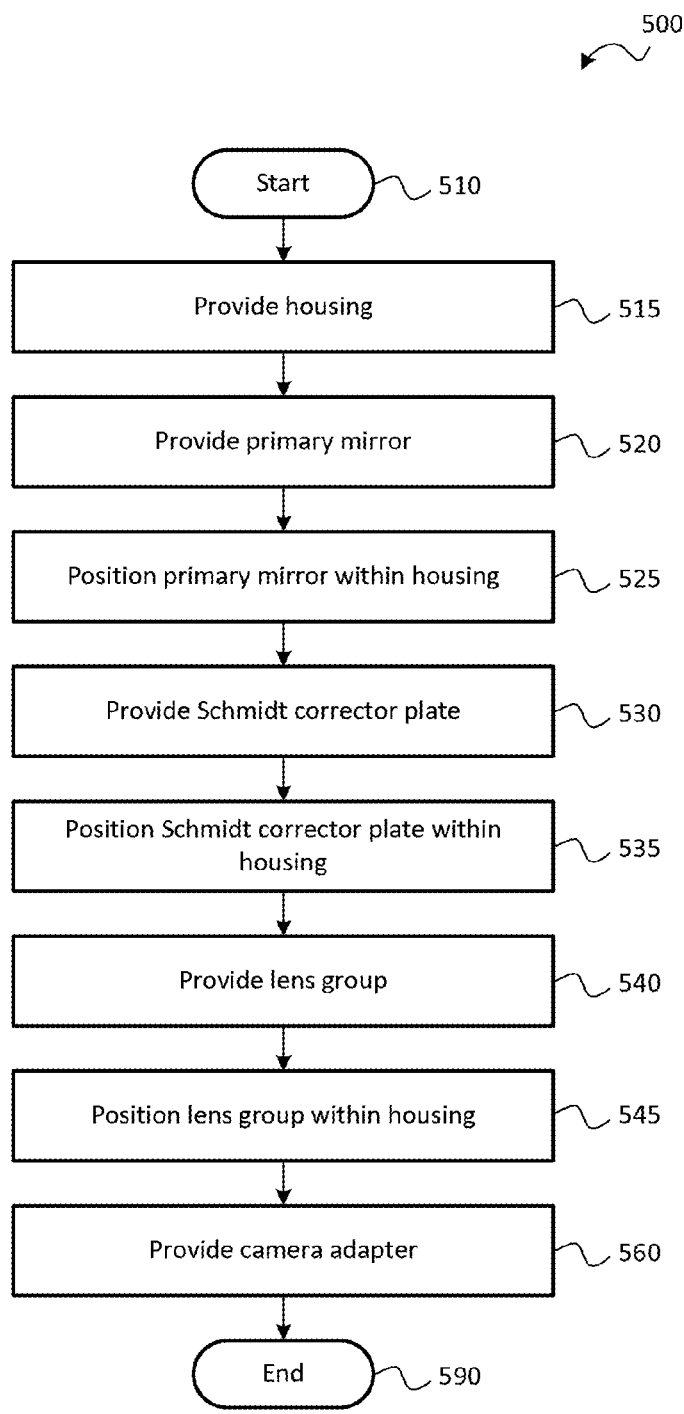
FIG. 5 is a flowchart diagram depicting a method of manufacturing a telescope system according to one embodiment.

Referring to FIG. 5, a flowchart diagram illustrates a method 500 of manufacturing a telescope system according to one embodiment of the invention. The method 500 will be described in connection with the telescope system 100 of FIGS. 1 to 3. However, the method 500 is not limited to the telescope system 100 of these Figures, but may instead be used to manufacture a telescope system according to various alternative embodiments.

The method 500 may start 510 with a step 515 in which the housing 120 of the telescope 110 is provided. The housing 120 may be formed of any of a variety of materials utilizing any known process. The housing 120 may have a generally tubular shape as shown, with the aperture end 122 open to define the entrance aperture 210, and the mirror end 124 closed.

In a step 520, the primary mirror 202 may be provided. The primary mirror 202 may have a spherical shape as set forth previously. The exact shape and/or material composition of the primary mirror 202 may depend on the wavelength range(s) of light to be received by the telescope 110. In a step 525, the primary mirror 202 may be positioned within the housing 120, proximate the mirror end 124.

In a step 530, the Schmidt corrector plate 200 may be provided. The Schmidt corrector plate 200 may have an annular shape with surface contouring that directs the light 106 at the primary mirror 202 in a manner that corrects for the spherical shape of the primary mirror 202, as discussed previously. The exact shape and/or material composition of the Schmidt corrector plate 200 may depend on the wavelength range(s) to be received by the telescope 110. In a step 535, the Schmidt corrector plate 200 may be positioned within the housing 120, proximate the aperture end 122.

In a step 540, the lens group 204 may be provided. The lens group 204 may have multiple lenses 240, which may be made through the same or different methods. The exact shape and/or material composition of the lenses 240 may depend on the wavelength range(s) to be received by the telescope 110. The lenses 240 may be secured together in a fixed relationship relative to the retention ring 310, or in a different retention structure. In a step 545, the lens group 204 may be positioned within the housing 120, proximate the aperture end 122 in alignment with the exit aperture 212.

In a step 560, the camera adapter 116 may be provided. The camera adapter 116 may be made through any of a variety of techniques. In some embodiments, the camera adapter 116 may be injection molded from plastic materials. In alternative embodiments, other materials may be used including but not limited to metals, ceramics, elastomers, and composite materials. In some embodiments, the camera adapter 116 may be formed of machined metal. If desired, multiple camera adapters 116 may be provided in the step 560, as mentioned previously, to enable adaptation of the telescope 110 to a variety of camera body designs. The method 500 may then end 590.

Optionally, the method 500 may include calibration of various components of the telescope 110. For example, in an optional calibration step, a camera body 114 may be secured to the telescope 110 and the relative positions and/or orientations of the Schmidt corrector plate 200, the primary mirror 202, and/or the lens group 204 may be adjusted such that the telescope 110 and the camera body 114 produce an image of optimal clarity, with minimal distortion. Such calibration may additionally or alternatively include collimation and/or focusing as described previously.

Further, the support 112 may optionally be manufactured as part of the method 500. The support 112 may be made through the use of any of a variety of methods known in the art.

The order of the various steps of the method 500 shown in FIG. 5 is merely exemplary; those of skill in the art will recognize that the steps of the method 500 may be reordered in numerous combinations. Further, any of the steps of the method 500 may be omitted or replaced with any alternative that would be known to a person of skill in the art.

Exemplary Specifications

Referring to FIG. 6, a chart 600 illustrates exemplary specifications that may be incorporated into the design of a telescope system, such as the telescope system 100 of FIGS. 1-3. Those of skill in the art will recognize that these are merely exemplary specifications; variations may be made within the scope of the present disclosure.

Alternatives

Although the use of the Schmidt corrector plate 200 may be advantageous, other optical correctors may be used in the alternative to the Schmidt corrector plate 200 to provide compensation for the spherical shape of the primary mirror 202. One such alternative will be shown and described in connection with FIGS. 7A, 7B, and 7C.

Figure 7A:
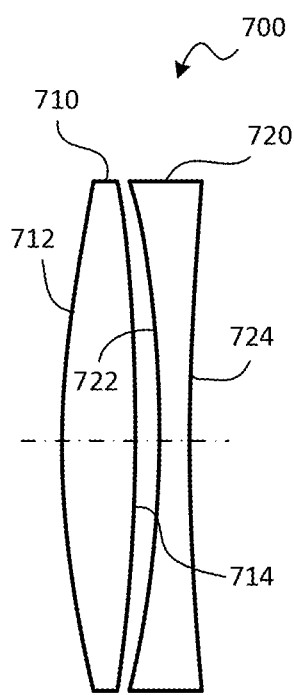
FIGS. 7A, 7B, 7C are side elevation views of symmetrical, plano-symmetrical, and asymmetrical Houghton corrector plates, respectively, according to alternative embodiments.
Figure 7B:
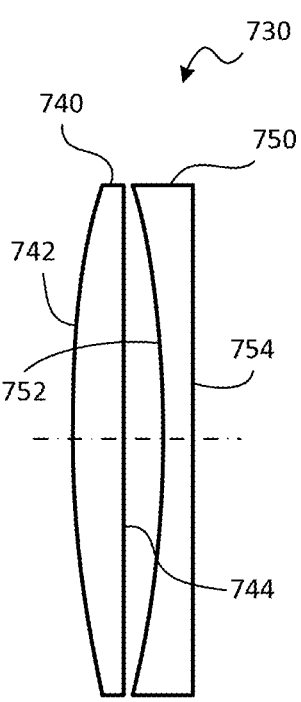
Figure 7C:
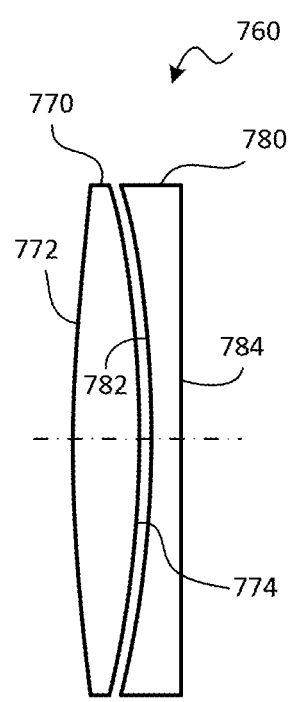

Referring to FIGS. 7A, 7B, and 7C, side elevation views illustrate symmetrical, plano-symmetrical, and asymmetrical Houghton corrector plates, respectively, according to alternative embodiments. More specifically, FIG. 7A illustrates a symmetrical Houghton corrector plate 700, FIG. 7B illustrates a plano-symmetrical Houghton corrector plate 730, and FIG. 7C illustrates an asymmetrical Houghton corrector plate 760.

In general, a Houghton corrector may utilize an afocal set of lenses positioned proximate, but not in contact with each other. The lens surfaces of the lenses of a Houghton corrector may be spherical and/or flat (i.e., spherical with an infinite radius). A Houghton corrector may utilize any number of lenses, but in some embodiments, may have two lenses.

The symmetrical Houghton corrector plate 700 of FIG. 7A may have a first lens 710 and a second lens 720. The first lens 710 may have a first surface 712 and a second surface 714. The second lens 720 may have a third surface 722 and a fourth surface 724. The first surface 712 and the second surface 714 may both be convex, and the third surface 722 and the fourth surface 724 may both be concave. The first surface 712 may have a radius that is equal in magnitude (but opposite in direction) to that of the third surface 722. Similarly, the third surface 722 may have a radius that is equal in magnitude (but opposite in direction) to that of the fourth surface 724. This configuration may advantageously compensate for both spherical aberration and coma for any corrector plate position.

The plano-symmetrical Houghton corrector plate 730 of FIG. 7B may have a first lens 740 and a second lens 750. The first lens 740 may have a first surface 742 and a second surface 744. The second lens 750 may have a third surface 752 and a fourth surface 754. The first surface 742 may be convex, and the third surface 752 may be concave. The second surface 744 and the fourth surface 754 may both be planar (i.e., spherical with an infinite radius). The first surface 742 may have a radius that is equal in magnitude (but opposite in direction) to that of the third surface 752.

This configuration may be easily fabricated and may have lower chromatism, but may have residual coma that may or may not be significant.

The asymmetrical Houghton corrector plate 760 of FIG. 7C may have a first lens 770 and a second lens 780. The first lens 770 may have a first surface 772 and a second surface 774. The second lens 780 may have a third surface 782 and a fourth surface 784. The first surface 772 and the second surface 774 may both be convex, and the third surface 782 and the fourth surface 784 may both be concave. The first surface 772, the second surface 774, the third surface 782, and the fourth surface 784 may all have radii that are different from each other. Such a configuration may provide advantageous compensation for certain mirror relative apertures.

The symmetrical Houghton corrector plate 700, the plano-symmetrical Houghton corrector plate 730, and the asymmetrical Houghton corrector plate 760 are shown in FIGS. 7A, 7B, and 7C as having generally discoid shapes. However, if implemented in a telescope such as the telescope 110 of FIGS. 1, 2, and 3, the symmetrical Houghton corrector plate 700, the plano-symmetrical Houghton corrector plate 730, and/or the asymmetrical Houghton corrector plate 760 may be modified to be annular in shape so as to permit light to exit the interior of the telescope to reach the image sensor 246. This may be done, for example, by omitting the central portion of the Houghton corrector plate, leaving only the annular outer ring. FIGS. 7A, 7B, and 7C are merely exemplary; other Houghton corrector plates, and indeed, other corrector plates in general, may be used in conjunction with the principles of the present disclosure.

The above description and referenced drawings set forth particular details with respect to possible embodiments. Those of skill in the art will appreciate that the techniques described herein may be practiced in other embodiments. First, the particular naming of the components or capitalization of terms is not mandatory or significant, and the mechanisms that implement the techniques described herein may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A telescope system for facilitating capture of images of light, the telescope system comprising:

a housing comprising a mirror end and an aperture end comprising an entrance aperture through which the light enters the housing;

a primary mirror positioned within the housing, proximate the mirror end, the primary mirror having a spherical shape;

a corrector plate positioned within the housing, proximate the entrance aperture, wherein the corrector plate is shaped to direct the light toward the primary mirror in a manner that substantially compensates for the spherical shape of the primary mirror, the corrector plate having a passageway; and a lens group comprising a plurality of lenses, all of which are positioned within the housing between the corrector plate and the primary mirror, proximate the aperture end, wherein the lens group is positioned and configured such that light is directed through the lens group by the primary mirror, and is focused at a focal location further than the corrector plate from the primary mirror;

wherein at least one lens of the lens group has a dimension larger than the size of the passageway in the corrector plate.

2. The telescope system of claim 1, wherein the corrector plate comprises a Schmidt corrector plate.

3. The telescope system of claim 1, wherein the housing further comprises an exit aperture at the aperture end, wherein the lens group is further configured to project the light through the exit aperture such that the focal location is positioned outside the housing.

4. The telescope system of claim 3, wherein the corrector plate comprises a substantially annular shape that encircles the exit aperture.

5. The telescope system of claim 1, further comprising a camera adapter comprising a telescope fixation feature securable proximate the aperture end of the housing, and a camera fixation feature securable to a camera body, wherein, when the camera adapter is secured proximate the aperture end and secured to the camera body, the camera adapter and the camera body are both positioned outside the housing, and an image sensor of the camera body is positioned proximate the focal location.

6. The telescope system of claim 5, wherein the camera adapter comprises a telescope fixation member which has the telescope fixation feature, and a camera fixation member having the camera fixation feature, wherein the telescope fixation member is coupled to the camera fixation member in a manner that permits relative rotation between the telescope fixation member and the camera fixation member to allow rotational adjustment of the camera body relative to the housing.

7. The telescope system of claim 1, further comprising a support that supports the housing at a user-adjustable orientation.

8. A method for capturing images of light through use of a telescope system comprising a housing, a primary mirror, a corrector plate having a passageway, and a lens group comprising a plurality of lenses, all of which are positioned between the corrector plate and the primary mirror, the method comprising:

receiving the light through an entrance aperture in an aperture end of the housing;

with the corrector plate, directing the light toward the primary mirror in a manner that substantially compensates for a spherical shape of the primary mirror, wherein the primary mirror is positioned within the housing, proximate a mirror end of the housing;

with the primary mirror, reflecting the light toward the lens group, wherein the lens group is positioned within the housing between the corrector plate and the primary mirror, proximate the aperture end; and with the lens group, focusing the light at a focal location further than the corrector plate from the primary mirror;

wherein at least one lens of the lens group has a dimension larger than the size of the passageway in the corrector plate.

9. The method of claim 8, further comprising collimating the telescope system by adjusting an orientation of the lens group relative to the primary mirror.

10. The method of claim 8, wherein the housing further comprises an exit aperture at the aperture end, wherein focusing the light at the focal location comprises projecting the light through the exit aperture such that the focal location is positioned outside the housing.

11. The method of claim 10, wherein the corrector plate comprises a Schmidt corrector plate having a substantially annular shape, and wherein the passageway comprises a central passageway that encircles the exit aperture, wherein projecting the light through the exit aperture comprises projecting the light through the central passageway.

12. The method of claim 10, further comprising, after focusing the light at the focal location:
    capturing the light at an image sensor of a camera body; and
    generating an image based on the light captured by the image sensor.

13. The method of claim 8, wherein the telescope system further comprises a camera adapter comprising a telescope fixation feature and a camera fixation feature, the method further comprising, prior to receiving the light through the entrance aperture:
    securing the telescope fixation feature proximate the aperture end of the housing such that the camera adapter is positioned outside the housing; and
    securing the camera fixation feature to a camera body such that the camera body is positioned outside the housing and an image sensor of the camera body is positioned proximate the focal location.

14. The method of claim 13, wherein the camera adapter comprises a telescope fixation member comprising the telescope fixation feature, and a camera fixation member comprising the camera fixation feature, the method further comprising, after securing the camera fixation feature to the camera body, rotating the camera fixation member relative to the telescope fixation member to adjust an angle at which the camera adapter secures the camera body, relative to the housing.

15. A method for manufacturing a telescope system for facilitating capture of images of light, the method comprising:
    providing a housing comprising a mirror end and an aperture end comprising an entrance aperture through which the light is able to enter the housing;
    providing a primary mirror comprising a spherical shape;
    positioning the primary mirror within the housing, proximate the mirror end;
    providing a corrector plate having a passageway;
    positioning the corrector plate within the housing, proximate the entrance aperture, such that the corrector plate is able to direct the light toward the primary mirror in a manner that substantially compensates for the spherical shape of the primary mirror;
    providing a lens group comprising a plurality of lenses, wherein at least one lens of the lens group has a dimension larger than the size of the passageway in the corrector plate; and
    positioning the lens group such all of the plurality of lenses are within the housing, proximate the aperture end, between the corrector plate and the primary mirror, such that the lens group receives the light from the primary mirror and focuses the light at a focal location further than the corrector plate from the primary mirror.

16. The method of claim 15, wherein the corrector plate comprises a Schmidt corrector plate.

17. The method of claim 15:
    wherein the housing further comprises an exit aperture at the aperture end;
    and wherein positioning the lens group further comprises positioning the lens group such that the lens group is able to project the light through the exit aperture such that the focal location is positioned outside the housing.

18. The method of claim 17, wherein the corrector plate comprises a substantially annular shape that encircles the exit aperture, wherein projecting the light through the exit aperture comprises projecting the light through the passageway of the corrector plate, and wherein the passageway comprises a central passageway defined by the substantially annular shape.

19. The method of claim 15, further comprising:
    providing a camera adapter comprising a telescope fixation feature and a camera fixation feature;
    wherein the telescope fixation feature is securable proximate the aperture end of the housing such that the camera adapter is positioned outside the housing;
    and wherein the camera fixation feature is securable to a camera body such that the camera body is positioned outside the housing and an image sensor of the camera body is positioned proximate the focal location.

20. The method of claim 19, wherein the camera adapter comprises a telescope fixation member comprising the telescope fixation feature, and a camera fixation member comprising the camera fixation feature, wherein providing the camera adapter comprises providing a rotatable coupling capable of rotatably coupling the telescope fixation member to the camera fixation member to permit adjustment of an angle at which the camera adapter secures the camera body, relative to the housing.

21. A telescope system for facilitating capture of images of light, the telescope system comprising:
    a housing comprising a mirror end and an aperture end comprising an entrance aperture through which the light enters the housing;
    a primary mirror positioned within the housing, proximate the mirror end, the primary mirror having a spherical shape;
    a corrector plate positioned within the housing, proximate the entrance aperture, wherein the corrector plate is shaped to direct the light toward the primary mirror in a manner that substantially compensates for the spherical shape of the primary mirror, the corrector plate having a passageway; and
    a lens group comprising a plurality of lenses, at least three of which are positioned within the housing between the corrector plate and the primary mirror, proximate the aperture end, wherein the lens group is positioned and configured such that light is directed through the lens group by the primary mirror, and is focused at a focal location further than the corrector plate from the primary mirror;

wherein at least one lens of the lens group has a dimension larger than the size of the passageway in the corrector plate.

22. The telescope system of claim 21, wherein the corrector plate comprises a Schmidt corrector plate.

23. The telescope system of claim 21, wherein the housing further comprises an exit aperture at the aperture end, wherein the lens group is further configured to project the light through the exit aperture such that the focal location is positioned outside the housing.

24. The telescope system of claim 23, wherein the corrector plate comprises a substantially annular shape that encircles the exit aperture.

25. The telescope system of claim 21, further comprising a camera adapter comprising a telescope fixation feature securable proximate the aperture end of the housing, and a camera fixation feature securable to a camera body, wherein, when the camera adapter is secured proximate the aperture end and secured to the camera body, the camera adapter and the camera body are both positioned outside the housing, and an image sensor of the camera body is positioned proximate the focal location.

26. The telescope system of claim 25, wherein the camera adapter comprises a telescope fixation member which has the telescope fixation feature, and a camera fixation member having the camera fixation feature, wherein the telescope fixation member is coupled to the camera fixation member in a manner that permits relative rotation between the telescope fixation member and the camera fixation member to allow rotational adjustment of the camera body relative to the housing.

27. The telescope system of claim 21, further comprising a support that supports the housing at a user-adjustable orientation.

28. A method for capturing images of light through use of a telescope system comprising a housing, a primary mirror, a corrector plate having a passageway, and a lens group comprising a plurality of lenses, at least three of which are positioned between the corrector plate and the primary mirror, the method comprising:
receiving the light through an entrance aperture in an aperture end of the housing;
with the corrector plate, directing the light toward the primary mirror in a manner that substantially compensates for a spherical shape of the primary mirror, wherein the primary mirror is positioned within the housing, proximate a mirror end of the housing;
with the primary mirror, reflecting the light toward the lens group, wherein the lens group is positioned within the housing between the corrector plate and the primary mirror, proximate the aperture end; and
with the lens group, focusing the light at a focal location further than the corrector plate from the primary mirror;
wherein at least one lens of the lens group has a dimension larger than the size of the passageway in the corrector plate.

29. The method of claim 28, further comprising collimating the telescope system by adjusting an orientation of the lens group relative to the primary mirror.

30. The method of claim 28, wherein the housing further comprises an exit aperture at the aperture end, wherein focusing the light at the focal location comprises projecting the light through the exit aperture such that the focal location is positioned outside the housing.

31. The method of claim 30, wherein the corrector plate comprises a Schmidt corrector plate having a substantially annular shape, and wherein the passageway comprises a central passageway that encircles the exit aperture, wherein projecting the light through the exit aperture comprises projecting the light through the central passageway.

32. The method of claim 30, further comprising, after focusing the light at the focal location:
capturing the light at an image sensor of a camera body; and
generating an image based on the light captured by the image sensor.

33. The method of claim 28, wherein the telescope system further comprises a camera adapter comprising a telescope fixation feature and a camera fixation feature, the method further comprising, prior to receiving the light through the entrance aperture:
securing the telescope fixation feature proximate the aperture end of the housing such that the camera adapter is positioned outside the housing; and
securing the camera fixation feature to a camera body such that the camera body is positioned outside the housing and an image sensor of the camera body is positioned proximate the focal location.

34. The method of claim 33, wherein the camera adapter comprises a telescope fixation member comprising the telescope fixation feature, and a camera fixation member comprising the camera fixation feature, the method further comprising, after securing the camera fixation feature to the camera body, rotating the camera fixation member relative to the telescope fixation member to adjust an angle at which the camera adapter secures the camera body, relative to the housing.

35. A method for manufacturing a telescope system for facilitating capture of images of light, the method comprising:
providing a housing comprising a mirror end and an aperture end comprising an entrance aperture through which the light is able to enter the housing;
providing a primary mirror comprising a spherical shape;
positioning the primary mirror within the housing, proximate the mirror end;
providing a corrector plate having a passageway;
positioning the corrector plate within the housing, proximate the entrance aperture, such that the corrector plate is able to direct the light toward the primary mirror in a manner that substantially compensates for the spherical shape of the primary mirror;
providing a lens group comprising a plurality of lenses, wherein at least one lens of the lens group has a dimension larger than the size of the passageway in the corrector plate; and
positioning the lens group such that at least three of the plurality of lenses are within the housing, proximate the aperture end, between the corrector plate and the primary mirror, such that the lens group receives the light from the primary mirror and focuses the light at a focal location further than the corrector plate from the primary mirror.

36. The method of claim 35, wherein the corrector plate comprises a Schmidt corrector plate.

37. The method of claim 35:
wherein the housing further comprises an exit aperture at the aperture end;
and wherein positioning the lens group further comprises positioning the lens group such that the lens group is able to project the light through the exit aperture such that the focal location is positioned outside the housing.

38. The method of claim 37, wherein the corrector plate comprises a substantially annular shape that encircles the exit aperture, wherein projecting the light through the exit aperture comprises projecting the light through the passageway of the corrector plate, and wherein the passageway comprises a central passageway defined by the substantially annular shape.

39. The method of claim 35, further comprising:
providing a camera adapter comprising a telescope fixation feature and a camera fixation feature;
wherein the telescope fixation feature is securable proximate the aperture end of the housing such that the camera adapter is positioned outside the housing;
and wherein the camera fixation feature is securable to a camera body such that the camera body is positioned outside the housing and an image sensor of the camera body is positioned proximate the focal location.

40. The method of claim 39, wherein the camera adapter comprises a telescope fixation member comprising the telescope fixation feature, and a camera fixation member comprising the camera fixation feature, wherein providing the camera adapter comprises providing a rotatable coupling capable of rotatably coupling the telescope fixation member to the camera fixation member to permit adjustment of an angle at which the camera adapter secures the camera body, relative to the housing.

41. A telescope system for facilitating capture of images of light, the telescope system comprising:
a housing comprising a mirror end and an aperture end comprising an entrance aperture through which the light enters the housing;
a primary mirror positioned within the housing, proximate the mirror end, the primary mirror having a spherical shape;
a corrector plate positioned within the housing, proximate the entrance aperture, wherein the corrector plate is shaped to direct the light toward the primary mirror in a manner that substantially compensates for the spherical shape of the primary mirror, the corrector plate having a generally annular shape defining a central passageway having a passageway diameter;
a lens group comprising a plurality of lenses, at least one of which has an outer diameter greater than the passageway diameter and is positioned within the housing between the corrector plate and the primary mirror, proximate the aperture end, wherein the lens group is positioned and configured such that light is directed through the lens group by the primary mirror and is focused at a focal location further than the corrector plate from the primary mirror.

42. The telescope system of claim 41, wherein the corrector plate comprises a Schmidt corrector plate.

43. The telescope system of claim 41, wherein the housing further comprises an exit aperture at the aperture end, wherein the lens group is further configured to project the light through the exit aperture such that the focal location is positioned outside the housing.

44. The telescope system of claim 43, wherein the corrector plate comprises a substantially annular shape that encircles the exit aperture.

45. The telescope system of claim 41, further comprising a camera adapter comprising a telescope fixation feature securable proximate the aperture end of the housing, and a camera fixation feature securable to a camera body, wherein, when the camera adapter is secured proximate the aperture end and secured to the camera body, the camera adapter and the camera body are both positioned outside the housing, and an image sensor of the camera body is positioned proximate the focal location.

46. The telescope system of claim 45, wherein the camera adapter comprises a telescope fixation member which has the telescope fixation feature, and a camera fixation member having the camera fixation feature, wherein the telescope fixation member is coupled to the camera fixation member in a manner that permits relative rotation between the telescope fixation member and the camera fixation member to allow rotational adjustment of the camera body relative to the housing.

47. The telescope system of claim 41, further comprising a support that supports the housing at a user-adjustable orientation.

48. A method for capturing images of light through use of a telescope system comprising a housing, a primary mirror, a corrector plate, and a lens group, the corrector plate having a generally annular shape defining a central passageway having a passageway diameter, the lens group comprising a plurality of lenses, at least one of which has an outer diameter greater than the passageway diameter and is positioned within the housing between the corrector plate and the primary mirror, the method comprising:
receiving the light through an entrance aperture in an aperture end of the housing;
with the corrector plate, directing the light toward the primary mirror in a manner that substantially compensates for a spherical shape of the primary mirror, wherein the primary mirror is positioned within the housing, proximate a mirror end of the housing;
with the primary mirror, reflecting the light toward the lens group, wherein the lens group is positioned within the housing between the corrector plate and the primary mirror, proximate the aperture end;
with the lens group, focusing the light at a focal location further than the corrector plate from the primary mirror.

49. The method of claim 48, further comprising collimating the telescope system by adjusting an orientation of the lens group relative to the primary mirror.

50. The method of claim 48, wherein the housing further comprises an exit aperture at the aperture end, wherein focusing the light at the focal location comprises projecting the light through the exit aperture such that the focal location is positioned outside the housing.

51. The method of claim 50, wherein the corrector plate comprises a Schmidt corrector plate having a substantially annular shape comprising a central passageway that encircles the exit aperture, wherein projecting the light through the exit aperture comprises projecting the light through the central passageway.

52. The method of claim 50, further comprising, after focusing the light at the focal location:
capturing the light at an image sensor of a camera body; and
generating an image based on the light captured by the image sensor.

53. The method of claim 48, wherein the telescope system further comprises a camera adapter comprising a telescope fixation feature and a camera fixation feature, the method further comprising, prior to receiving the light through the entrance aperture:
securing the telescope fixation feature proximate the aperture end of the housing such that the camera adapter is positioned outside the housing; and
securing the camera fixation feature to a camera body such that the camera body is positioned outside the housing and an image sensor of the camera body is positioned proximate the focal location.

54. The method of claim 53, wherein the camera adapter comprises a telescope fixation member comprising the telescope fixation feature, and a camera fixation member comprising the camera fixation feature, the method further comprising, after securing the camera fixation feature to the camera body, rotating the camera fixation member relative to the telescope fixation member to adjust an angle at which the camera adapter secures the camera body, relative to the housing.

55. A method for manufacturing a telescope system for facilitating capture of images of light, the method comprising:
providing a housing comprising a mirror end and an aperture end comprising an entrance aperture through which the light is able to enter the housing;
providing a primary mirror comprising a spherical shape;
positioning the primary mirror within the housing, proximate the mirror end;
providing a corrector plate having a generally annular shape defining a central passageway having a passageway diameter;
positioning the corrector plate within the housing, proximate the entrance aperture, such that the corrector plate is able to direct the light toward the primary mirror in a manner that substantially compensates for the spherical shape of the primary mirror;
providing a lens group comprising a plurality of lenses, a first lens of which has an outer diameter greater than the passageway diameter; and
positioning the lens group such that at least the first lens is within the housing, proximate the aperture end, between the corrector plate and the primary mirror, such that the lens group receives the light from the primary mirror and focuses the light at a focal location further than the corrector plate from the primary mirror.

56. The method of claim 55, wherein the corrector plate comprises a Schmidt corrector plate.

57. The method of claim 55, wherein the housing further comprises an exit aperture at the aperture end, positioning the lens group further comprises positioning the lens group such that the lens group is able to project the light through the exit aperture such that the focal location is positioned outside the housing.

58. The method of claim 57, wherein the corrector plate comprises a substantially annular shape that encircles the exit aperture, wherein projecting the light through the exit aperture comprises projecting the light through a central passageway defined by the substantially annular shape.

59. The method of claim 55, further comprising:
providing a camera adapter comprising a telescope fixation feature and a camera fixation feature;
wherein the telescope fixation feature is securable proximate the aperture end of the housing such that the camera adapter is positioned outside the housing;
and wherein the camera fixation feature is securable to a camera body such that the camera body is positioned outside the housing and an image sensor of the camera body is positioned proximate the focal location.

60. The method of claim 59, wherein the camera adapter comprises a telescope fixation member comprising the telescope fixation feature, and a camera fixation member comprising the camera fixation feature, wherein providing the camera adapter comprises providing a rotatable coupling capable of rotatably coupling the telescope fixation member to the camera fixation member to permit adjustment of an angle at which the camera adapter secures the camera body, relative to the housing.

* * * * *